United States Patent

Fruth et al.

[11] Patent Number: 5,897,825
[45] Date of Patent: *Apr. 27, 1999

[54] METHOD FOR PRODUCING A THREE-DIMENSIONAL OBJECT

[75] Inventors: Carl Fruth, Planegg; Hans Langer, Gräfelfing, both of Germany

[73] Assignee: 3D Systems, Inc., Valencia, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/817,998

[22] PCT Filed: Sep. 21, 1995

[86] PCT No.: PCT/EP95/03725

§ 371 Date: Apr. 11, 1997

§ 102(e) Date: Apr. 11, 1997

[87] PCT Pub. No.: WO96/11790

PCT Pub. Date: Apr. 25, 1996

[30] Foreign Application Priority Data

Oct. 13, 1994 [DE] Germany ............... 44 36 695

[51] Int. Cl.⁶ ............ B29C 35/08; B29C 41/02
[52] U.S. Cl. ............ 264/401; 264/308; 264/497; 364/468.26; 364/468.27; 425/174.4
[58] Field of Search .............. 264/308, 401, 264/497; 425/174.4; 364/468.26, 468.27

[56] References Cited

U.S. PATENT DOCUMENTS 4,999,143  3/1991  Hull et al. ............... 264/401
5,198,159  3/1993  Nakamura et al. ......... 264/401

FOREIGN PATENT DOCUMENTS

| 338 751 | 10/1989 | European Pat. Off. . |
| 484 182 | 5/1992 | European Pat. Off. . |
| 590 957 | 4/1994 | European Pat. Off. . |
| 436 352 B1 | 8/1994 | European Pat. Off. . |
| 655 317 | 5/1995 | European Pat. Off. . |
| 406 513 | 1/1991 | Germany . |
| 4309524 | 11/1993 | Germany . |
| 4436695 | 12/1995 | Germany . |
| WO 94/07681 | 4/1994 | WIPO . |

OTHER PUBLICATIONS

Benutzerhandbuch Magics 3.0, Materialise N.V., (1995) – No translation.

*Primary Examiner*—Leo B. Tentoni
*Attorney, Agent, or Firm*—Dennis R. Smalley; Forrest L. Collins

[57] ABSTRACT

In a method for producing a three-dimensional object (6) wherein the object is produced by successive solidification of individual layers (6a, 6b, 6c, 6d, 64) of a liquid or powderous material (3) by action of electromagnetic radiation (8, 10) and a supporting structure (20, 21) for supporting the object (6) is co-solidified together with the object (6), the supporting structure (20, 21) is decomposed in a three-dimensional fashion into an inner core region (22) an an outer envelope region (23) and the irradiation is varied for producing different characteristics of both regions.

18 Claims, 2 Drawing Sheets

METHOD FOR PRODUCING A THREE-DIMENSIONAL OBJECT

FIELD OF THE INVENTION

The application relates to a method for producing a three-dimensional object by successive solidification of individual layers of a curable liquid or powder material under the influence of electromagnetic irradiation, whereby a supporting structure for supporting the object is co-solidified with the object.

BACKGROUND OF THE INVENTION

A method for producing a three-dimensional object is known as "stereolithography". In this method a layer of a liquid or a powderous material is applied to a support or a previously solidified layer and thereafter solidified by irradiating a focused light beam, for example a laser beam, at the points corresponding to the object. The object is produced in a layerwise fashion by successively solidifying a plurality of layers one after the other.

The EP-A-0 338 751 discloses such a method whereby supporting structures for supporting portions of the object or the entire object, respectively, are solidified together with the object itself.

When constructing supporting structures, however, the following problems are encoutered.

At filigree structures as well as intersections of planes several individual supports are generated because of the separate surface compounds in the CAD-model. The individual supports can be closely adjacent to each other and/or intersect or penetrate each other. For exposing the supporting structure the contour lines of the individual supports are scanned at an extremely small spacing which causes them to melt together. It is not possible or very difficult to remove the thus produced supporting structure without destroying the component.

In order to prevent the closely adjacent contour lines of individual supports from melting together, it is possible to scan the supports without contour. In this case, however, the exposure of the supports must be very hard i.e. a high degree of solidification must be produced to prevent the supports from fraying at the edges. Again, it is very labour-intensive to remove the thus produced supporting structure from the component, or it may even be impossible to remove it without destruction thereof. The DE 43 09 524 discloses a method for producing a three-dimensional object whereby the entire object or each layer of the object to be formed, respectively, is decomposed into an inner core region and an outer envelope region and the irradiation is controlled in the core region and in the envelope region so as to produce different characteristics in both regions. The decomposition of the object to be formed into an envelope region and a core region is made in a computer. Object data corresponding to the decomposition of the object to be formed into core and envelope region are provided to a further computer which controls an irradiation device for solidifying the layers of the object to be formed. The decomposition allows to construct an object using constructional forms which are different from each other and advantageous corresponding to the respective requirements.

The WO 94/07 681 discloses a method for producing a three-dimensional object by successive solidification of overlying layers of the object, whereby at first partial regions of a layer are solidified and joined with respective partial regions of the previously solidified layer therebelow to form multilayered cells and thereafter adjacent partial regions of one layer are joined by solidifying narrow web regions. It is thereby intended to reduce the deformation of the object.

SUMMARY OF THE INVENTION

It is the object of the invention to provide a method for producing a three-dimensional object wherein a supporting structure produced simultaneously with the object has a homogeneous texture, the supporting structure can be produced in a short time and easily removed from the object after finishing the same.

This object is achieved by a method for producing a three-dimensional object that includes successive solidification of individual layers of a curable liquid or powder material under the influence of electromagnetic irradiation. A supporting structure for supporting the object is co-solidified together with the object. Furthermore, the supporting structure is decomposed in a three-dimensional manner into an inner core region and an outer envelope region, and the irradiation is varied to produce different characteristics in both regions. Further developments are defined in the subclaims.

By decomposing the supporting structure into the core region and the envelope or skin region in a three-dimensional fashion, the produced supporting structure is very homogeneous because no double irradiation or double exposure occurs within the supporting structure. By controlling the irradiation in the envelope region so as to differ from that of the core region the envelope region can be build to produce an easily detachable connection with the object and the core region can be build to produce a sufficiently stable supporting structure in a short construction time and to take up strain forces when forming the object with a low deformation of the supporting structure.

BRIEF DESCRIPTION OF THE DRAWINGS

A description of embodiments with reference to the figures follows.

In the figures.

DETAILED DESCRIPTION OF PREFERRED EMBODIMENTS

Figure 1:
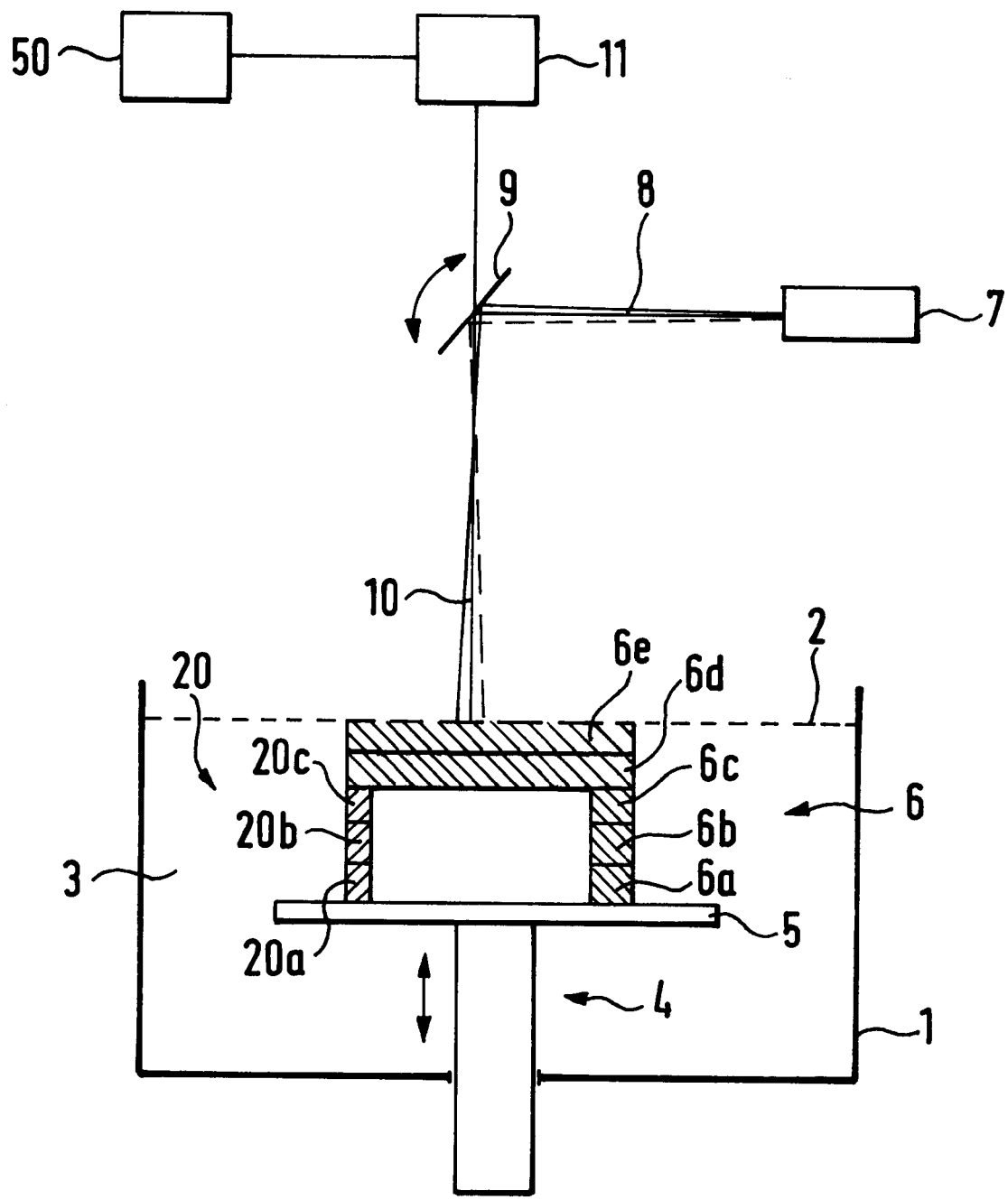
FIG. 1 is a diagrammatic representation of a device for carrying out the inventive method.

As best shown in FIG. 1 an apparatus for carrying out the inventive method comprises a tank or container 1 having an open top and being filled up to a level or a surface 2, respectively, with a material which is curable by action of electromagnetic radiation. Within the tank 1 there is a support 4 having a substantially plane and horizontal support plate 5 which is arranged parallel to the surface 2 and which can be displaced and positioned upwards and downwards in a direction perpendicular to the surface 3 or to the support plate 5, respectively, by means of a not shown elevation adjustment device.

On the support plate 5 there is an object 6 to be formed together with a supporting structure 20, whereby the object 6 and the supporting structure 20 are each formed of a plurality of layers 6a, 6b, 6c, 6d and 6e and 20a, 20b, 20c, respectively, each extending parallel with the surface 2 and the support plate 5.

A not shown device for smoothing the surface 2 of the curable material 3 is arranged above the tank 1.

An irradiation device 7 producing a focused light beam 8, for example a laser, is disposed above the tank 1. The focused light beam 8 is deflected as a deflected beam 10 onto the surface 2 of the curable material 3 within the tank 1 by means of a deflection device 9, for example a rotating mirror. A control unit 11 controls the deflection device 9 so that the deflected beam 10 strikes any desired point of the surface 2 of the curable material 3 in the tank 1. The control unit 11 is connected with a computer 50 which provides to the control unit 11 the corresponding data for solidifying the layers of the object 6 and of the supporting structure 20.

In the method for producing the three-dimensional object a first step is to position the support plate 5 within the tank 1 so that a distance equal to the predetermined layer thickness exists between the upper side of the support plate 5 and the surface 2 of the curable material 3 within the tank 1. The layer of the curable material above the support plate 5 is irradiated at predetermined places corresponding to the object 6 and to the associated supporting structure 20 by means of the light beam 8, 10 which is produced by the irradiation device 7 and controlled by the deflection device 9 and the control unit 11, whereby the material 3 solidifies and forms a solid layer 6a and 20a, respectively, corresponding to the shape of an object and to the supporting structure. Further layers 6b, 6c, 6d and 6e and 20b and 20c, respectively, are successively formed by lowering the support plate 5 by an amount corresponding to the respective layer thickness and again irradiating the places corresponding to the object 6 and to the supporting structure 20, respectively.

The object data and supporting structure data are calculated in the computer 50 for controlling the solidification of each layer by decomposing a three-dimensional model of the object 6 and of the supporting structure 20 into individual layers. The entire three-dimensional supporting structure 20 is decomposed in the computer 50 into an envelope region and a core region. The envelope region and the core region form separate independent parts or individual objects of the supporting structure. It is also possible to decompose the three-dimensional model of the supporting structure in a separate computer and to transfer the thus produced data to the computer 50. In the solidification process of each layer the irradiation will be different for the core region or the envelope region of the supporting structure. Owing to the decomposition a double exposure of intersecting parts of the supporting structure no longer occurs.

Figure 2:
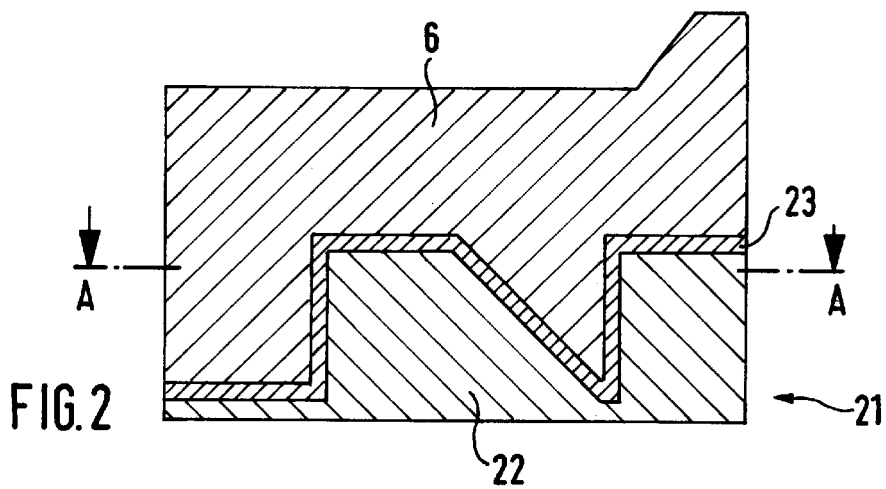
FIG. 2 is a diagrammatic cross-section of a portion of the object under formation together with a supporting structure according to one embodiment of the invention.
Figure 3:
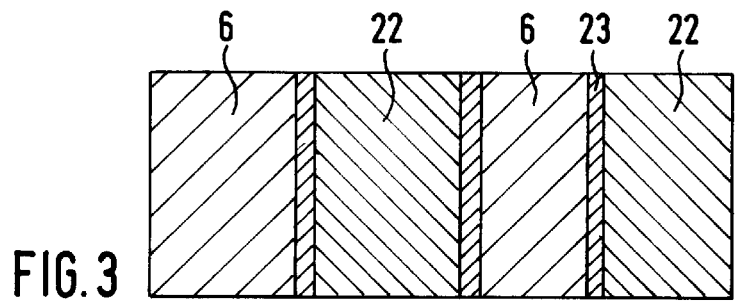
FIG. 3 is a sectional view along line A—A of FIG. 2.

FIG. 2 shows a cross-section through a supporting structure 21 in connection with the object 6 at a connecting region between the supporting structure 21 and the object 6. The supporting structure 21 is decomposed into a core region 22 and an envelope region 23 having different structures and thus a different characteristics. FIG. 3 representing a section along line A—A in FIG. 2 shows the joining of the supporting structure 21 through the envelope region 23 thereof to the object 6 of one layer.

Preferably, the irradiation is controlled in the core region 22 to minimize the deformation of the supporting structure 21 during the production of the object 6. To this end the core region 22 must be exposed in a hard and therefore unelastic manner, i.e. a strong solidification must be produced.

For reduction of the required construction time and for saving material the core region 22 of the supporting structure 21 is solidified in individual spaced partial regions which are either not connected at all or connected through joining webs. If the envelope region 23 is solidified in a sufficiently stable manner, it is also possible to completely eliminate the solidification of a core region 22. After finishing the object uncured material can be drained through appertures provided in the envelope regions and/or in the core region.

In the envelope region 23 the solidification of the supporting structure 21 is preferably controlled to produce a sufficiently stable but easily detachable bond of the supporting structure to the object. To this end the irradiation in the envelope region is soft, i.e. the degree of solidification is less than that of the core region, whereby the envelope region of the supporting structure does not adhere to the object in an undetachable manner in the bonding region.

It is also possible to solidify individual spaced partial regions of the envelope region 23 of the supporting structure, whereby the partial regions are either not connected at all or connected through joining webs. Preferably, the spacing of the partial regions in the envelope region is smaller than the spacing of the partial regions in the core region so that the object is sufficiently supported. In those portions of the envelope region 23 of the supporting structure 21 which are adjacent to the object only individual joined blocks or small clumps of the envelope region may be solidified to produce a perforated bonding to the object which facilitates the detachment of the supporting structure after finishing the object.

The wall thickness of the envelope region can be adjusted within the entire supporting structure and/or for each layer. This allows to adjust the distance between the supporting structure and the walls of the object under formation.

A suitable selection of the irradiation or exposure technique allows to achieve savings in construction time of up to 80% compared with the conventional method.

Figure 4:
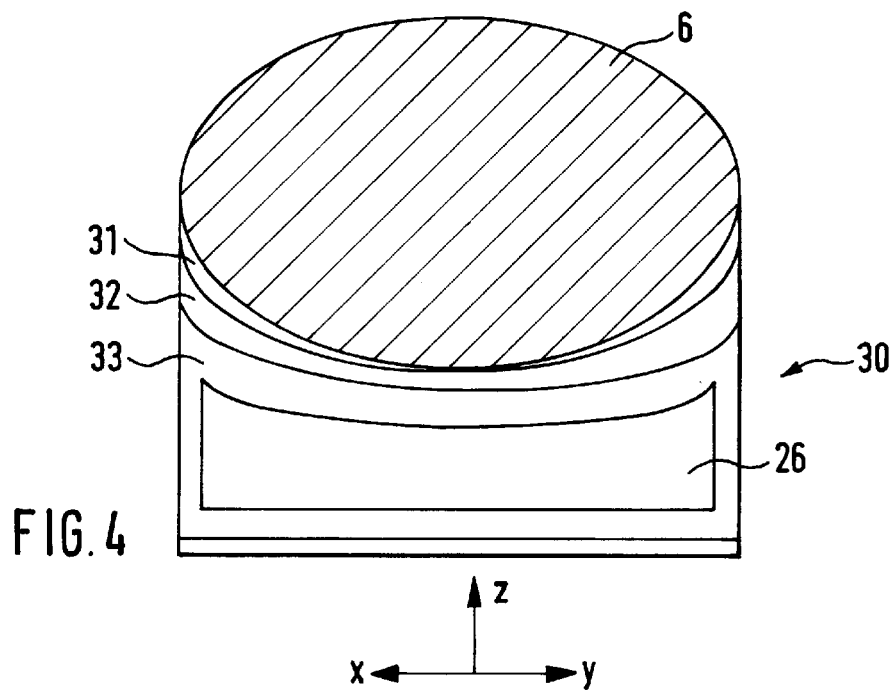
FIG. 4 is a diagrammatic cross-section of an object under formation with a supporting structure according to a further embodiment of the invention.

As best shown in FIG. 4 a further embodiment of the inventive method contemplates the decomposition of a supporting structure 30 into a core region 26 and envelope regions 31, 32, 33 forming several shells, whereby the regions 31, 32, 33, 26 are each an independent part or individual object of the supporting structure. The shell thicknesses may be different. For example, an envelope region can completely or partially encompass the core region. In FIG. 4 the envelope 31 has no Z-thickness but a XY-wall thickness. The envelope region 32 has merely Z-thickness whereas the envelope region 33 has a uniform wall thickness in XY- and Z-direction. When using this supporting structure the core 26 can be formed with distant partial regions. In such a shell-type decomposition it is possible to optimize the force flux through the supporting structure within minimum construction time.

We claim:

1. A method for producing a three-dimensional object on a layer-by-layer basis, the method comprising the steps of:
    providing object data defining said object for each layer,
    providing support data defining a supporting structure for said object,
    decomposing, in a three-dimensional fashion, said support data into core data defining an inner core region and skin data defining an outer skin region,
    providing layers of a radiation-curable material in preparation for forming layers of the object and support structure, curing said layers of said material using electromagnetic irradiation at places defined by said object data and said core and skin support data to form the object and support structure from a plurality of adhered layers of the object and support structure, and controlling said irradiation in said core region and said skin region so as to control said curing process to produce different properties of said cured material in said core region and said skin region.

2. The method of claim 1, comprising decomposing the support data for each layer.

3. The method of claim 1, comprising controlling said irradiation to cure said core region for minimizing deformation of said supporting structure when producing said object, and controlling said irradiation in said skin region for bonding said supporting structure to said object.

4. The method of claim 3, comprising controlling said irradiation in said core region to produce a strong solidification of said material and controlling said irradiation in said skin region to produce a soft solidification of said material.

5. The method of claim 1, comprising controlling said irradiation in said core region to produce individual spaced partial regions.

6. The method of claim 5, comprising controlling said irradiation to produce connecting webs joining adjacent partial regions.

7. The method of claim 1, comprising controlling said irradiation in said skin region to produce individual spaced partial regions.

8. The method of claim 7, comprising controlling said irradiation to produce connecting webs joining adjacent partial regions.

9. The method of claim 7, comprising controlling said irradiation so that a spacing between said partial regions in said skin region is smaller than a spacing between said partial regions in said core region.

10. The method of claim 1, comprising controlling said irradiation in said skin region to produce individual layers, a plurality of overlying layers or individual partial regions, or a layer in portions of said skin region adjacent to said object to produce a perforated bond to the object.

11. The method of claim 1, comprising controlling said irradiation to produce a uniform thickness of said skin region for said entire supporting structure.

12. The method of claim 1, comprising decomposing said support data to form skin data defining a varying wall thickness over the supporting structure.

13. The method of claim 1, comprising controlling said irradiation in said core region to minimize a deformation of said object during and after the solidification thereof and controlling said irradiation in said skin region to produce a smooth and exact surface.

14. The method of claim 1, comprising decomposing said support data into at least one second skin region and one second core region, and controlling said irradiation so as to produce different properties of said cured material in said second skin region and said second core region.

15. The method of claim 14, the wall thicknesses of said skin region and said second skin region are variable.

16. A method of claim 1, comprising controlling said irradiation to form apertures in said skin region for allowing uncured material to be discharged from said core region.

17. The method of claim 16, comprising controlling said irradiation to form apertures in said core region for allowing uncured material to be discharged from said core region.

18. Apparatus for producing a three-dimensional object on a layer-by-layer basis, the apparatus comprising:

a container filled with a material capable of solidification upon exposure to electromagnetic irradiation, a supporting device disposed within said container for supporting said object, an irradiation device producing a beam of electromagnetic radiation for solidifying said object, a processor device processing data defining said object and support data defining a supporting structure for said object, said processor device having means for decomposing said support data into a core region and an skin region, and means for controlling said irradiation device in said core region and said skin region so as to produce different properties of said cured material in said core region and said skin region.

* * * * *